(12) United States Patent
Couppee et al.

(10) Patent No.: US 12,546,406 B2
(45) Date of Patent: Feb. 10, 2026

(54) PNEUMATIC DEVICE WITH AN EXHAUST OF A HOUSING FOR RECEIVING ELECTRONIC COMPONENTS

(71) Applicant: ZF CV Systems Global GmbH, Bern (CH)

(72) Inventors: Ulrich Couppee, Coppenbrügge (DE); Ingo Fuhrmann, Langenhagen (DE); Marek Smardz, Wschowa (PL)

(73) Assignee: ZF CV Systems Global GmbH, Bern (CH)

( * ) Notice: Subject to any disclaimer, the term of this patent is extended or adjusted under 35 U.S.C. 154(b) by 518 days.

(21) Appl. No.: 17/986,095

(22) Filed: Nov. 14, 2022

(65) Prior Publication Data
US 2023/0151900 A1    May 18, 2023

(30) Foreign Application Priority Data
Nov. 16, 2021   (EP) .................................. 21208380

(51) Int. Cl.
| B60T 13/68 | (2006.01) |
| B60T 15/02 | (2006.01) |
| B60T 17/00 | (2006.01) |
| F16K 24/04 | (2006.01) |

(52) U.S. Cl.
CPC ............ *F16K 24/04* (2013.01); *B60T 13/683* (2013.01); *B60T 15/027* (2013.01); *B60T 17/004* (2013.01)

(58) Field of Classification Search
CPC .... B60T 13/683; B60T 15/025; B60T 15/027; B60T 15/52; B60T 15/54; B60T 17/004; B60T 17/008

USPC .................................... 303/9.75, 9.76, 7, 15
See application file for complete search history.

(56) References Cited

U.S. PATENT DOCUMENTS

| 3,302,530 | A | * | 2/1967 | Dobrikin | ............... B60T 17/083 92/64 |
| 6,102,494 | A | * | 8/2000 | Volz | ........................ B60T 8/368 303/DIG. 10 |
| 6,354,674 | B1 | * | 3/2002 | Iwamoto | ............. F15B 13/0832 303/119.3 |

(Continued)

FOREIGN PATENT DOCUMENTS

| CN | 204870980 U | 12/2015 |
| CN | 108146421 A | 6/2018 |

(Continued)

OTHER PUBLICATIONS

Translation: EP-1022204-A2. (Year: 2000).*

*Primary Examiner* — Thomas J Williams
(74) *Attorney, Agent, or Firm* — Dickinson Wright PLLC (57) ABSTRACT

A pneumatic device (1) for a brake system (100) includes a housing (3) for receiving electronic components. The housing is in fluid communication with the environment during operation of the pneumatic device (1). An exhaust path (15) having an exhaust port (17) and being in fluid communication with the housing (3) exhausts the pneumatic device (1) to the environment (5) via the exhaust port (17). An exhaust element (10) associated with the exhaust path (15) includes a liquid impermeable but gas permeable barrier between the housing (3) and the environment (5). The pneumatic device may be included in a brake system having such a pneumatic device, a commercial vehicle, and/or a method for assembly thereof.

19 Claims, 5 Drawing Sheets

(56) References Cited

U.S. PATENT DOCUMENTS

| | | | |
|---|---|---|---|
| 6,792,971 B2 * | 9/2004 | Roether | B60T 15/027 |
| | | | 137/627.5 |
| 2016/0123417 A1 | 5/2016 | Rehfus et al. | |
| 2019/0226574 A1 | 7/2019 | Basham et al. | |
| 2023/0151900 A1 * | 5/2023 | Couppee | B60T 17/004 |
| | | | 188/352 |

FOREIGN PATENT DOCUMENTS

| | | | | |
|---|---|---|---|---|
| CN | 212423078 U | 1/2021 | | |
| CN | 213384210 U | 6/2021 | | |
| DE | 2829290 A1 | 1/1980 | | |
| DE | 19712209 A1 * | 10/1998 | | B60T 17/02 |
| DE | 10232219 A1 | 4/2003 | | |
| DE | 102006017503 A1 | 10/2007 | | |
| DE | 102011119875 A1 | 6/2013 | | |
| DE | 102014012709 A1 | 3/2016 | | |
| DE | 102014111041 A1 | 4/2016 | | |
| DE | 102016011032 A1 | 3/2018 | | |
| DE | 102019119808 A1 | 1/2021 | | |
| DE | 102020108757 A1 | 9/2021 | | |
| EP | 1022204 A2 * | 7/2000 | | B60T 13/263 |
| EP | 1060966 A2 * | 12/2000 | | B60T 15/027 |
| EP | 1270356 A2 | 2/2003 | | |
| EP | 3650106 A1 | 5/2020 | | |
| EP | 3650107 A1 | 5/2020 | | |
| GB | 2401330 A | 11/2004 | | |
| JP | S6022555 A | 2/1985 | | |
| JP | H07291110 A | 11/1995 | | |
| JP | H1199924 A | 4/1999 | | |
| WO | 2004099749 A1 | 11/2004 | | |
| WO | 2021148256 A1 | 7/2021 | | |

* cited by examiner

PNEUMATIC DEVICE WITH AN EXHAUST OF A HOUSING FOR RECEIVING ELECTRONIC COMPONENTS

FIELD

The present disclosure relates to a pneumatic device for a brake system, the pneumatic device having a housing for receiving electronic components and that is in fluid communication with the environment during operation of the pneumatic device, and an exhaust path having an exhaust port and that is in fluid communication with the housing for exhaust of the pneumatic device to the environment via the exhaust port. The present disclosure further relates to a vehicle having such a pneumatic device and to a method for assembling such a pneumatic device.

In particular, such pneumatic devices may be pneumatic brake systems for vehicles, in particular for commercial vehicles, or brake valves and/or relay valves therefor.

BACKGROUND

Frequently, pneumatic devices of the type described above are used in environments where various foreign media may be present. In particular, pneumatic brake devices and their components, such as relay valves, may be exposed to water from their environment, for example, during cleaning, operation in or after rain, flooding, or deliberate fording of bodies of water.

Pneumatic devices of the type described above typically have pneumatic connections to the environment of the pneumatic device, for example, to exhaust excess pressure from a pressurized section of the pneumatic device, or to equalize pressure with the environment of the pneumatic device. However, such a pneumatic connection to the environment of the pneumatic device may allow foreign media located in the environment to enter the pneumatic device. In particular, the ingress of liquids, such as water, can impair the functionality of the pneumatic device. In the case of pneumatic brake systems, for example, ingress of foreign media, especially water, can lead to corrosion or, for example, to complete failure of the brake system as a result of water freezing. Measures must therefore be taken to make the unintentional ingress of foreign media more difficult or, at best, to prevent it.

In the prior art, pneumatic devices with sealing devices are known that are designed to prevent the unintentional ingress of small amounts of spray water or water below a certain level. Among others, GB 2 401 330 A, DE 10 2016 011 032 A1, and DE 28 29 290 A1 disclose such pneumatic devices.

SUMMARY

The object of the present invention is to enable a safe operation of a pneumatic device of the type described at the outset even in environments in which large quantities of a foreign medium, in particular water, are present.

In a first aspect, the object is achieved by a pneumatic device having a housing for receiving electronic components and that is in fluid communication with the environment during operation of the pneumatic device, and an exhaust path having an exhaust port and that is in fluid communication with the housing for exhaust of the pneumatic device to the environment via the exhaust port. The pneumatic device has an exhaust element associated with an exhaust path which is configured to provide a liquid impermeable but gas permeable barrier between the housing for receiving electronic components and the environment. In other words, the exhaust element avoids the ingress of liquids but still remains permeable for gases. In this context, a liquid refers to a nearly incompressible fluid that conforms to the shape of its container but retains a nearly constant volume independent of pressure, wherein the volume is definite if the temperature and pressure are constant. A gas refers to a compressible fluid. It will be understood that the described liquid state and gas state refer to the states of matter of the mediums, which occur during operation of the pneumatic device under the environmental conditions.

The core benefits during operation of the exhaust element are, on the one hand, that the housing for receiving the electronic components, which is in fluid communication with the exhaust path, is securely protected against an undesired ingress of liquids. On the other hand, gases are allowed to pass through the exhaust element to allow the exhaust of the pneumatic device and provide a reference pressure corresponding to the pressure of the environment for e.g. a pressure sensor arranged in the housing for receiving the electronic components.

In the context of the present invention, the environmental conditions include pressure in the range between approximately 0 to 1 bar and a temperature range above −40° C. up to 100° C. The internal or operating pressure within the pneumatic device defines a pressure difference compared to the environmental pressure. The internal pressure may be up to 13 bar occurring in parts of the pneumatic device which are not pressure sensitive.

Preferably, the pneumatic device has a pressure sensor being in fluid connection with the exhaust path, which is configured to detect a pressure in the pneumatic device. The sensor is preferably a pressure sensor arranged in the housing for receiving the electronic components.

In a preferred embodiment, the pneumatic device further includes a damping chamber, which is in fluid communication with the exhaust port and the environment. Preferably, a flow path from the housing for receiving the electronic components to the environment extends at least partly through the damping chamber to exhaust the pneumatic device. Such a damping chamber may be a silencer configured to reduce overall noise of an operation of the pneumatic device, e.g. during braking.

Preferably, said damping chamber is in fluid communication with the environment by a pressure passage. Thus, the damping chamber damps the sound and vibrations occurring during exhaust, at least partly.

In a further preferred embodiment, the pneumatic device further includes an equalizing chamber being in fluid communication with the exhaust path and configured to provide an equalizing volume to reduce pressure peaks during operation of the pneumatic device. The present disclosure takes into account that exhaust elements may be sensitive to pressure peaks. By providing an equalizing volume, said pressure peaks are significantly reduced.

Preferably, the pneumatic device further includes a throttle provided in the exhaust path which is configured to narrow the flow cross-section in the exhaust path. Such a throttle may preferably cooperate with the equalizing volume such that the throttle connects the equalizing chamber to the exhaust port. Because the throttle narrows the flow cross-section of the exhaust path, pressure peaks and, in particular, backpressure peaks are reduced. Thus, even a sensitive exhaust element is securely protected when arranged upstream the throttle.

It is further preferred, according to one aspect, that the volume of the equalizing chamber is adapted to the peak pressure during operation of the pneumatic device. Thus, in total an enlarged volume defined by the exhaust path and the equalizing chamber is provided, thereby significantly reducing the inside pressure of the pneumatic device. It will be understood that the additional volume provided by the equalizing chamber is chosen in accordance with the peak pressure during operation that may be up to 13 bar, such that the pressurized air distributed in the exhaust path and the housing for receiving the electronic components will not exceed a predefined internal pressure, preferably an internal pressure up to 2 bar.

Preferably, the flow cross-section of the throttle is adapted to the volume provided by the equalizing chamber to avoid peak pressure during operation of the pneumatic device. It will be understood that when the equalizing chamber has an enlarged volume, the flow cross-section of the throttle is enlarged when compared to a pneumatic device with an equalizing chamber having a lower volume.

In a preferred embodiment, the exhaust element is arranged in the exhaust path upstream of the exhaust port. By arranging the exhaust element upstream of the exhaust port, the exhaust element is securely protected from the environment, e.g. from chemicals or paintings used during cleaning or painting of a vehicle.

In another preferred embodiment, the exhaust element is arranged in the exhaust port adjacent to the damping chamber. Thus, the exhaust path extending from the exhaust port towards the housing for receiving the electronic components is securely protected against water ingress by the exhaust element. Further, the exhaust element is arranged at a position in the exhaust port where it is securely protected against dirt or chemicals from the environment.

Preferably, the pneumatic device further comprises a relay piston arranged in the exhaust path, wherein the exhaust element is coupled to the relay piston. Thus, the exhaust element and the relay piston can be pre-assembled, in order to simplify the mounting of the pneumatic device. The pre-assembling further ensures a repeatable and accurate placement of the exhaust element inside the pneumatic device.

Further preferred, the exhaust element is coupled to the relay piston by a snap-fit connection. A snap-fit connection provides a secure attachment of the exhaust element to the relay piston and is cost efficient at the same time.

Preferably, the exhaust element is a liquid impermeable but gas permeable membrane. A membrane is a space-saving exhaust element that can be easily integrated in the pneumatic device.

In a preferred embodiment, the pneumatic device is a pneumatic brake system, a brake valve arrangement, or a relay valve. Brake systems are often installed at least partly in the vehicle frame, which is exposed during service life to wet weather conditions, splash water, and high-pressure water streams during cleaning e.g., before service actions. At the same time, housings for receiving electrical or electronic components do often contain a pressure sensor, which needs to have the environmental pressure as a reference for measuring the brake pressure of such a brake system. This requires the breathing of the sensor to the environment. By having the exhaust element according to the invention, water ingress is securely avoided.

Further preferred, the relay piston is at least partly formed of a polymer. Thus, the relay piston is lightweight. In addition, a high degree of function integration is enabled by the plurality of known technologies for manufacturing polymer parts. For example by injection molding, a relay piston having integral snap-fit elements for coupling with the exhaust element can be manufactured by a so called one-shot process which refers to a molding process including only one process step.

In a second aspect, the invention relates to a brake system comprising a pneumatic device according to the first aspect of the invention. By having such a pneumatic device, the preferred embodiments and benefits of the pneumatic device according to the first aspect are at the same time preferred embodiments and benefits of the brake system according to the second aspect. Thus, reference is made to the above description of the pneumatic device according to the first aspect of the invention, in particular to the dependent claims.

Preferably, the pneumatic device of the brake system is a brake valve arrangement of the brake system.

In a third aspect, the invention relates to a commercial vehicle comprising a brake system according to the second aspect. It should be understood, that by having a brake system according to the second aspect, the aspects and benefits of the brake system are at the same time preferred embodiments and benefits of the commercial vehicle according to the third aspect of the invention, in particular as they are described in the dependent claims. Thus, reference is made to the above description of the pneumatic device according to the first aspect and the brake system having such a pneumatic device according to the second aspect of the invention.

According to a fourth aspect of the invention, the above stated problem is solved by a method for assembling a pneumatic device, preferably a pneumatic device according to the first aspect, the method comprising the steps: providing an exhaust element configured to provide a liquid impermeable but gas permeable barrier, arranging the exhaust element in the pneumatic device at a position associated with an exhaust path of the pneumatic device, such that a liquid impermeable but gas permeable barrier between a housing for receiving the electronic components of the pneumatic device and the environment is provided.

It should be understood that the method incorporating the arrangement of the exhaust element in the pneumatic device according to the first aspect has similar or equal aspects as the first aspect of the invention, in particular as they are described in the description herein. Thus, reference is made to the above description of the pneumatic device according to the first aspect of the invention and the following description.

BRIEF DESCRIPTION OF THE DRAWINGS

For a more complete understanding of the present disclosure, the disclosure will now be described in detail with reference to the accompanying drawings. In the accompanying drawings.

DETAILED DESCRIPTION

The detailed description below will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed herein after. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The word "a" or "an" does not exclude the plurality. The wording "a number of" items comprising also the number 1, i.e. a single item, and further numbers like 2, 3, 4 and so forth.

Figure 1:
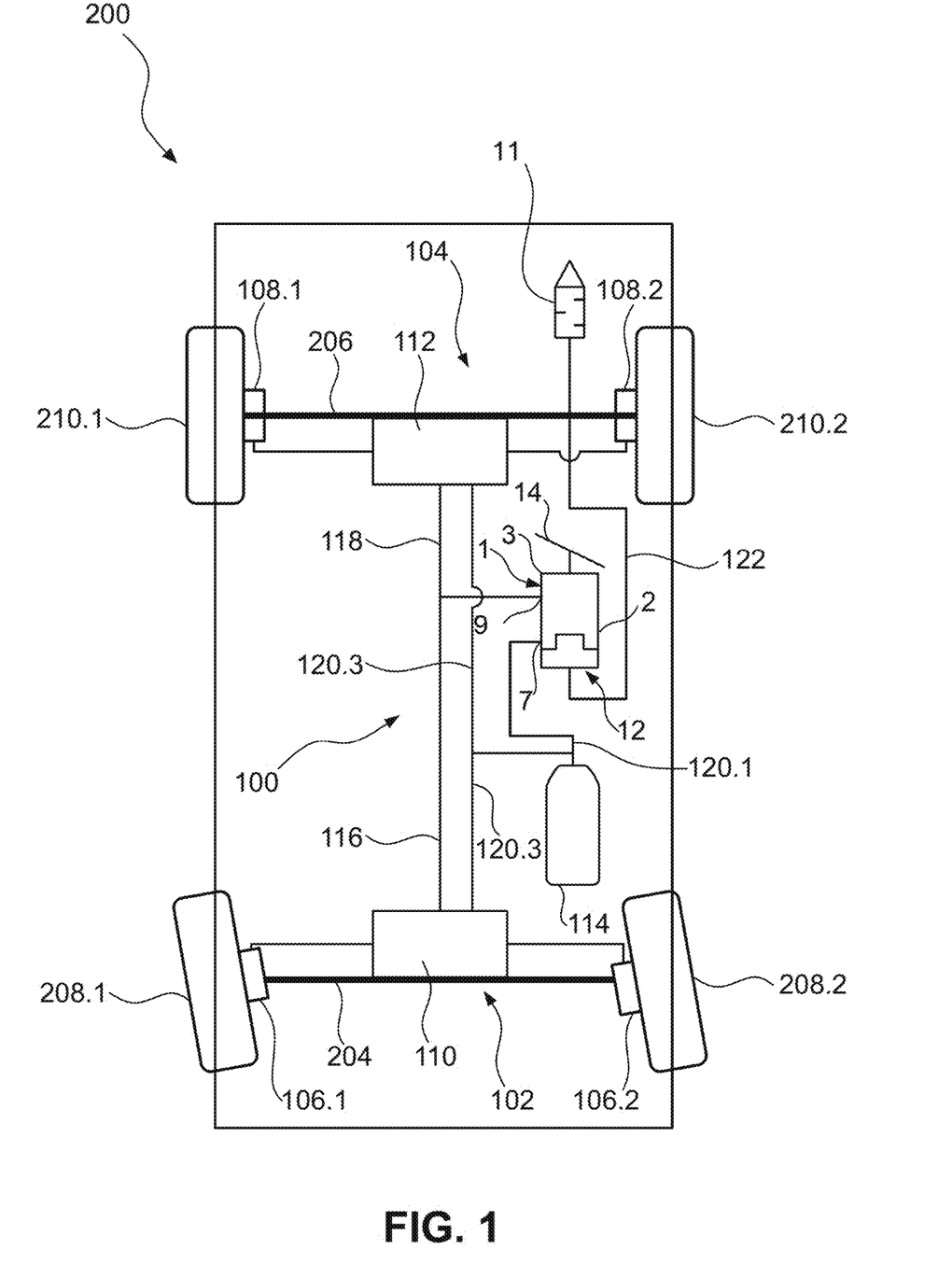
FIG. 1 shows a schematic layout of a vehicle having a brake system comprising a pneumatic device according to the present disclosure.

A vehicle 200, as shown in FIG. 1, in particular a commercial vehicle, includes a front axle 204 and a rear axle 206. For braking front wheels 208.1, 208.2 of the front axle 204 and rear wheels 210.1, 210.2 of the rear axle 206 the vehicle 200 may include a brake system 100 having a front axle brake circuit 102 for braking the front wheels 208.1, 208.2 and a rear axle brake circuit 104 for braking the rear wheels 210.1, 210.2. For braking the wheels 208.1, 208.2, 210.1, 210.2, the brake system 100 comprises front axle brake actuators 106.1, 106.2 and rear axle brake actuators 108.1, 108.2. The front axle brake actuators 106.1, 106.2 are connected to a front axle brake modulator 110 while the rear axle brake actuators 108.1, 108.2 are connected to a rear axle brake modulator 112. For providing compressed air at a supply pressure, the brake system 100 comprises a compressed air supply 114. Of course, it may comprise more than one air supply.

In order to brake the vehicle 200 a brake pressure needs to be supplied to the front axle brake modulator 110 and the rear axle brake modulator 112. For providing the brake pressure, the brake system 100 comprises the pneumatic device 1 (see FIGS. 3 and 4). In the embodiment shown in FIG. 1, the pneumatic device 1 is a brake valve arrangement.

As shown in FIG. 1, the brake valve arrangement 1 includes a lower housing 2 having a supply connection 7, a working connection 9, and an exhaust portion 12. The exhaust portion 12 includes an exhaust path 15 (see FIGS. 3 to 5). The supply connection 7 is connected to the compressed air supply 114 via supply line 120.1 for receiving pressurized air at the supply pressure.

Upon actuation by a user or an electronic control unit such as a unit for autonomous driving, the brake valve arrangement 1 provides a brake pressure corresponding to the degree of actuation provided by the user or a respective signal. To allow an actuation, the brake valve arrangement 1 includes an actuation element 14, which is formed as a brake pedal in this embodiment. The brake valve arrangement 1 is configured to modulate the brake pressure supplied to the working connection 9 dependent on a degree of actuation of the actuation element 14. If the brake pedal 14 is only slightly actuated, a low brake pressure is supplied to the working connection 9 while a high brake pressure is supplied to the working connection 9 when the brake pedal 14 is fully actuated.

The brake valve arrangement 1 is connected to the front axle brake modulator 110 and the rear axle brake modulator 114 via connecting lines 116, 118. In this embodiment the brake valve arrangement 1 is formed as a single circuit brake valve arrangement 1 having only one working connection 9 for providing brake pressure. Both, the front axle connecting line 116 connecting the brake valve arrangement 1 to the front axle brake modulator 110 as well as the rear axle connecting line 118 connecting the brake valve arrangement 1 to the rear axle brake modulator 112 are connected to the same working connection 9 of the brake valve arrangement 1. In other embodiments, the brake valve arrangement 1 also could be formed as a multi circuit brake valve arrangement 1 having multiple working connections 9 for providing the same and/or different brake pressures to the brake circuits 102, 104.

The brake modulators 110, 112 receive the brake pressure provided by the brake valve arrangement 1 and provide pressurized air at the same brake pressure but at a higher volume to the respective brake actuators 106.1, 106.2, 108.1, 108.2. Therefore, the brake modulators 110, 112 are also connected to the compressed air supply via supply lines 120.2, 120.3. It shall be noted that the front axle brake modulator 110 and/or the rear axle brake modulator 112 may also be configured to further modify the brake pressure. For example, the front axle brake modulator 110 could comprise ABS-modules (not shown) for providing an ABS-function. Moreover, the brake actuators 106.1, 106.2, 108.1, 108.2 may also be directly connected to the brake valve arrangement 1.

For releasing the brake of the vehicle 200 the brake pressure needs to be released from the brake actuators 106.1, 106.2, 108.1 108.2. The brake valve arrangement 1 is therefore configured to exhaust the brake actuators 106.1, 106.2, 108.1 108.2 by connecting the working connection 9 to the exhaust portion 12. In order to exhaust pressurized air, the air needs to be released to the environment through an opening. Such an opening, however, allows water to enter the brake system 100. Brake valve arrangements, in particular brake valve arrangements having a brake pedal, are usually located in a low position of the vehicle 200. A maximum fording depth of the vehicle 200 is thereby limited, since water could ingress in the brake system 100 via the exhaust portion 12 when the vehicle 200 drives through water and the water level reaches to the exhaust portion. In regular vehicles, the available maximum fording depth is sufficient and standard brake valve arrangements assemblies can be used. If however, increased fording depths are needed, special measures need to be taken. Therefore, fording versions of brake valve arrangements and/or brake valve arrangement assemblies are provided.

In FIG. 1, the brake valve arrangement 1 has a housing 3 for receiving the electronic components, which is connected to a damping chamber 11. The damping chamber 11 may be provided by an exhaust silencer. For releasing the brakes of the vehicle 200, the brake pressure is released from the brake actuators 106.1, 106.2, 108.1 108.2 via the connecting lines 116, 118, the brake valve arrangement 1, the housing 3 for receiving the electronic components, the exhaust line 122, and the remote exhaust silencer (damping chamber) 11.

Figure 2:
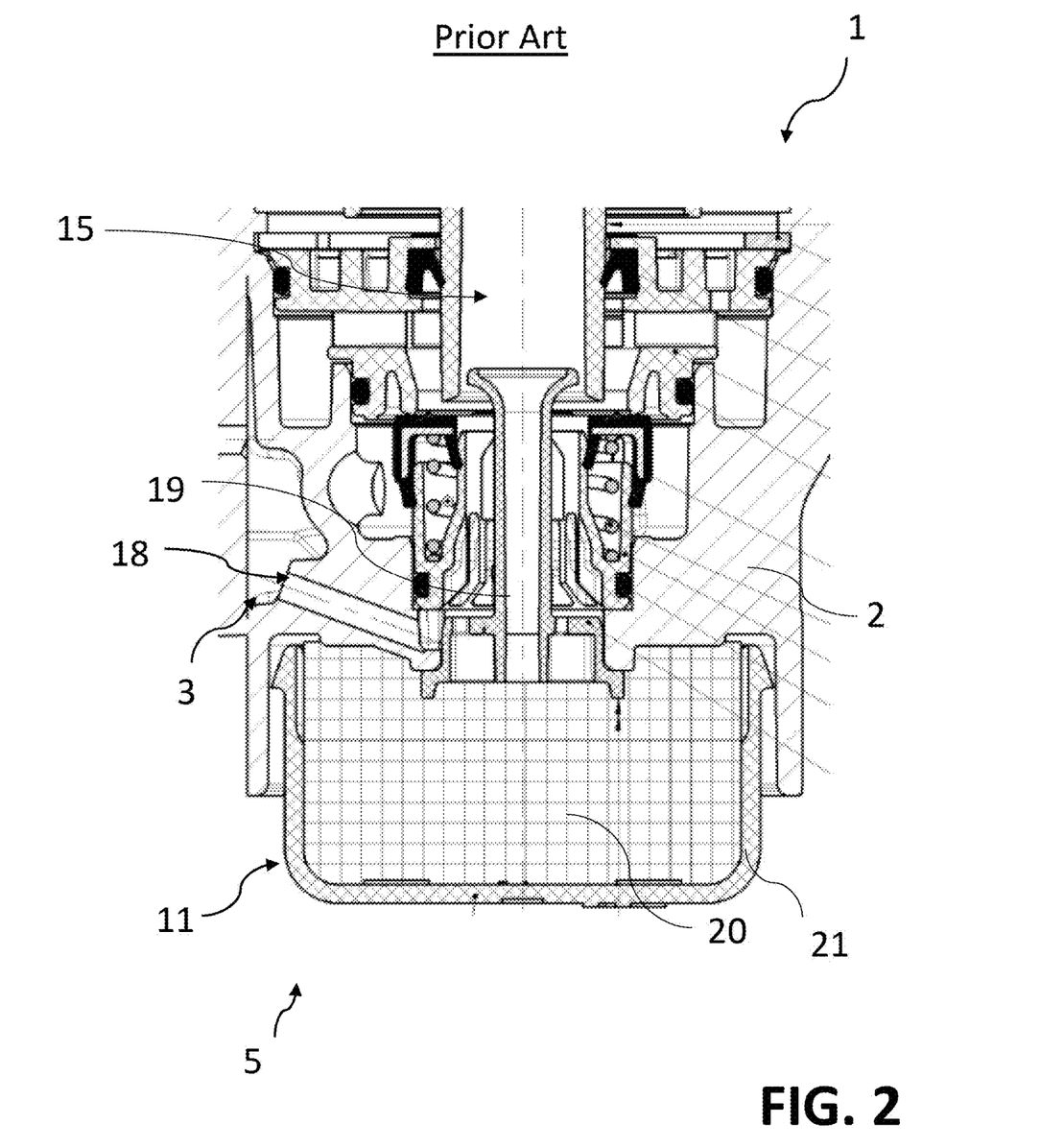
FIG. 2 shows a sectional view of a pneumatic device according to the prior art.

The pneumatic device 1 shown in FIG. 2 is a brake valve arrangement according to the prior art. The brake valve arrangement 1 comprises lower housing 2 in which a housing 3 for receiving the electronic components is received. The housing 3 for receiving the electronic components may have several electronic components, as for example sensors detecting the brake pressure, solenoids, Electronic Control Unit (ECU) and the like.

The housing 3 for receiving the electronic components has to be in fluid connection with the environment 5 to provide a referenced pressure for, e.g. the sensor detecting the brake pressure.

The brake valve arrangement of FIG. 2 further has a damping chamber 11. In the shown embodiment, the damping chamber 11 is a silencer that comprises a fixing bracket 21 that engages the lower housing 2 and holds a sound damping material 20 in place. The brake valve arrangement 1 further has an exhaust path 15 that is in fluid connection with housing 3 for receiving the electronic components, an internal chamber of the brake valve arrangement 1, e.g. a force equalization chamber, and the environment 5 via a flow path 19 that at least partly extends through the silencer 11. Thus, pressurized air flowing through the exhaust path 15 will be guided by the flow path 19 directly into the sound damping material 20. Thus, excessive noise is thereby prevented.

The housing 3 for receiving the electronic components is connected to the environment by a breathing channel 18, which may have a labyrinth-like channel structure, to reduce water ingress into the housing 3 for receiving the electronic components. Such a labyrinth-type channel 18 may reduce the water ingress, but cannot provide a secure barrier between the environment and the housing 3 for receiving the electronic components 3 to avoid water ingress. The housing 3 for receiving the electronic components 3 is configured for breathing to the environment via the channel 18 in order to avoid excess pressure difference occurring due to increase in temperature. For instance, the increase in temperature can cause damage to the sealing elements in the pneumatic components and the small leakage occurring because of said pneumatic components can be released via exhaust element 10.

Figure 3:
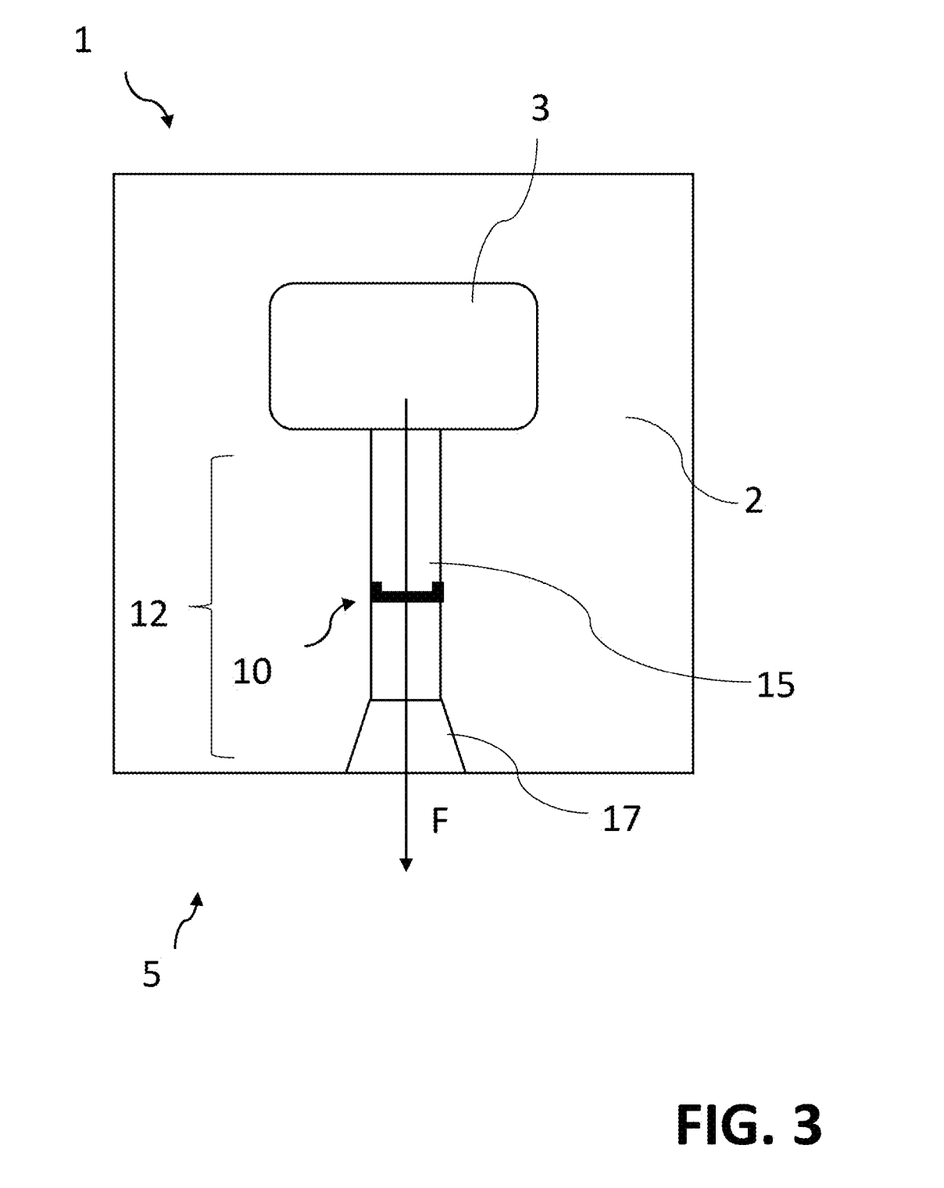
FIG. 3 shows a schematic layout of a pneumatic device according to the present disclosure.

As shown in a schematic view according to FIG. 3, a pneumatic device 1 according to the present disclosure provides a housing 3 for receiving the electronic components that is preferably received in lower housing 2. The housing 3 for receiving the electronic components is in fluid connection with the environment 5.

The pneumatic device 1 further has an exhaust portion 12, which comprises at least partly an exhaust path 15, which is configured to connect the housing 3 for receiving the electronic components to the environment 5 via an exhaust port 17. Thus, pressurized air can exhaust from the housing 3 for receiving the electronic components via the exhaust path 15 and the exhaust port 17 in a flow direction F.

The pneumatic device 1 further has an exhaust element 10 that is associated with the exhaust path 15, preferably arranged within the exhaust path 15 or adjacent to the exhaust port 17.

The exhaust element 10 is configured to provide a gas permeable but liquid impermeable barrier between the environment 5 and the housing 3 for receiving the electronic components.

By arranging the exhaust element 10 at a position associated with the exhaust path 15, the exhaust element 10 is protected against dirt, chemicals and other interfering substances from the environment 5.

On the one hand, the gas permeable exhaust element 10 allows the exhaust of the housing for receiving the electronic components 3 via the exhaust path 15 and the exhaust port 17 in the flow direction F and at the same time allows a gas permeable connection to the environment 5 for any sensors arranged within the housing 3 for receiving the electronic components. On the other hand, the liquid impermeable barrier provided by the exhaust element 10 securely avoids a water ingress into the exhaust path 15 and into the housing 3 for receiving the electronic components, which water ingress may result in damaging the electronic component within the housing 3 for receiving the electronic components.

Figure 4:
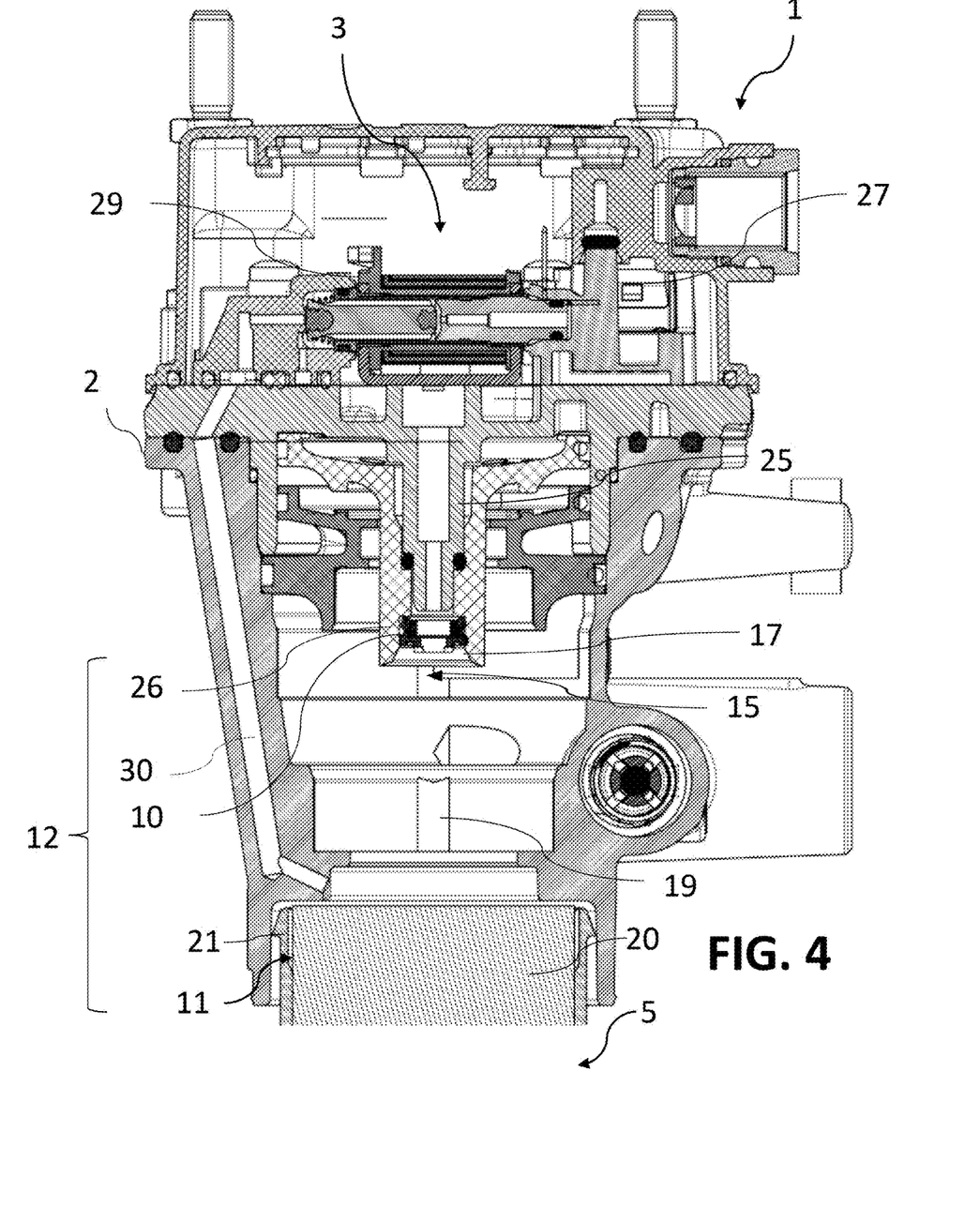
FIG. 4 shows a sectional view of the pneumatic device according to a first preferred embodiment.

FIG. 4 shows the pneumatic device 1 according to a first preferred embodiment.

The pneumatic device 1 is in the form of a brake valve arrangement in the embodiment shown in FIG. 4.

The brake valve arrangement 1 includes lower housing 2 and a housing 3 for receiving the electronic components coupled to lower housing 2, which is in fluid connection with the environment 5.

The brake valve arrangement 1 has an exhaust portion 12, which comprises an exhaust path 15 configured to provide a fluid connection between the housing 3 for receiving the electronic components and the environment 5 via an exhaust port 17.

The brake valve arrangement 1 further has a damping chamber 11, wherein a flow path 19 is provided and configured to connect the exhaust path 15 to the environment 5 via the damping chamber 11.

In the shown embodiment, the damping chamber 11 is a silencer that comprises a fixing bracket 21 that engages lower housing 2 and holds a sound damping material 20 in place. The brake valve arrangement 1 further has an exhaust path 15 in fluid communication with the housing 3 for receiving the electronic components and the environment via an exhaust port 17 and a flow path 19, which at least partly extends through the silencer (damping chamber) 11. Thus, pressurized air flowing through the exhaust path 15 will be guided by the flow path 19 directly into the sound damping material 20. Thus, excessive noise is prevented.

The brake valve arrangement 1 further has an exhaust element 10, which is associated with the exhaust path 15. In the embodiment shown in FIG. 4, the exhaust element is arranged adjacent to the exhaust port 17, thereby providing a gas permeable, but fluid impermeable membrane between the housing 3 for receiving the electronic components and the environment 5. Thus, the exhaust element 10 is easily accessible for purposes of maintenance.

The brake valve arrangement 1 further comprises a relay piston 26 having a housing cover 25, which is arranged in the exhaust path 15 adjacent to the exhaust element 10. The relay housing cover 25 is received in the relay piston 26, which is coupled to lower housing 2.

The brake valve arrangement 1 further has a sensor 27 in fluid connection with the housing 3 for receiving the electronic components, preferably arranged inside the housing 3 for receiving the electronic components.

An exhaust channel 30 is provided between at least one solenoid valve 29 and the damping chamber 11. The channel 30 is configured to exhaust a pre-control volume provided by the solenoid valve 29 to move the relay piston 26, wherein the brake valve arrangement 1 has at least one solenoid valve 29 configured to selectively close the exhaust channel 30.

The embodiment of the brake valve arrangement shown in FIG. 4 is preferably used for brake systems 100 (see FIG. 1) with a low back-pressure occurring during operation.

Figure 5:
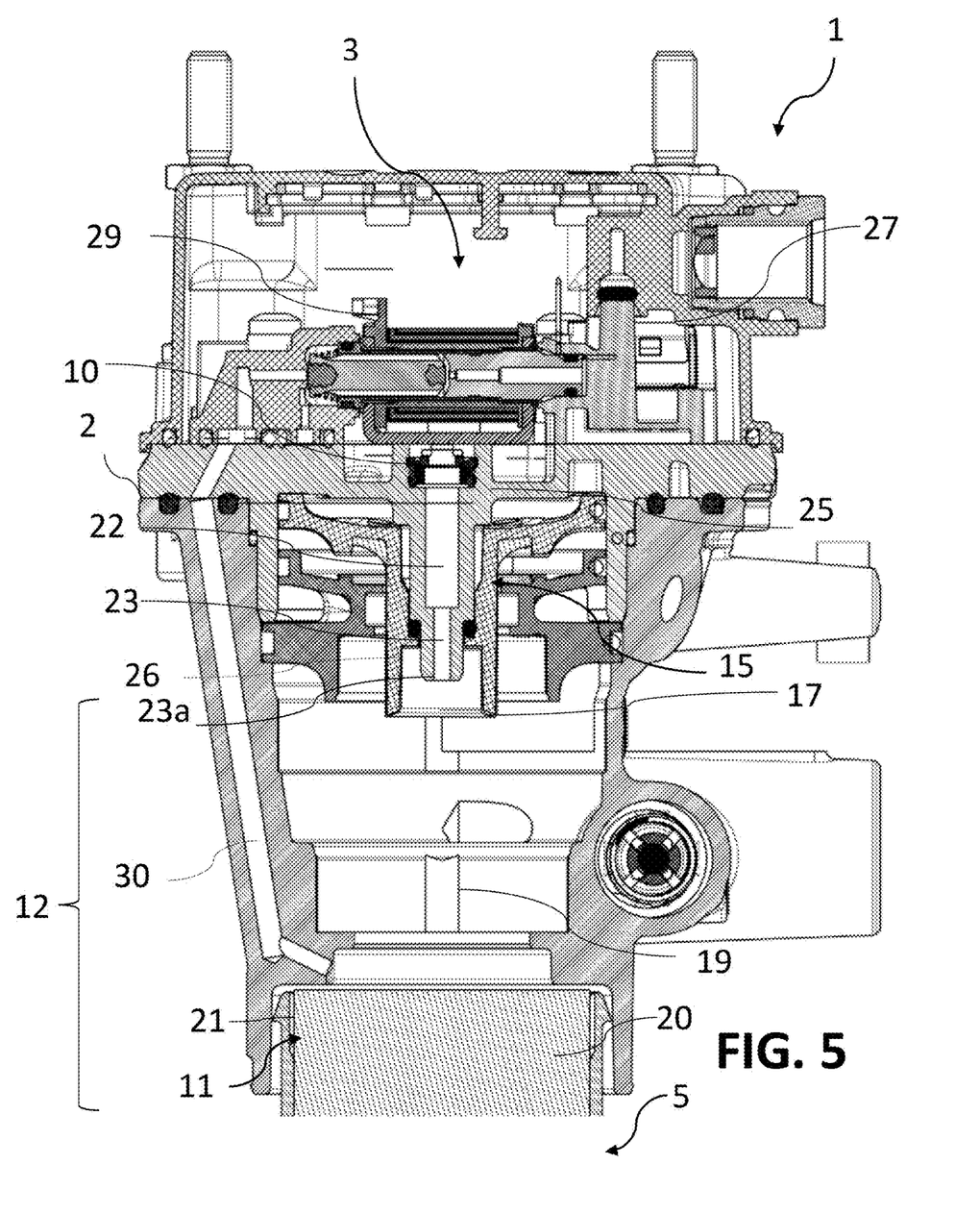
FIG. 5 shows a sectional view of the pneumatic device according to a second preferred embodiment.

The pneumatic device 1 shown in FIG. 5 is a brake valve arrangement and differs from the brake valve arrangement according to FIG. 4 by the positioning of the exhaust element 10.

In the embodiment shown in FIG. 5, the exhaust element 10 is arranged in the exhaust path 15 upstream the exhaust port 17. Thus, the exhaust element 10 is protected from dust, dirt and other undesired substances entering the damping chamber 11 from the environment 5.

The brake valve arrangement 1 further has an equalizing chamber 22, which is in fluid connection with the exhaust path 15 and configured to provide an equalizing volume to avoid pressure peaks acting on the exhaust element 10.

The exhaust path 15 further has a throttle 23, which is in fluid communication with the equalizing chamber 22 and the flow path 19 via the exhaust port 17.

The throttle 23 is configured to narrow the flow path defined by the exhaust path 15. Thus, pressure peaks acting on the exhaust element 10 are reduced due to the narrowed flow cross-sectional area as indicated by "23*a*" in FIG. 5.

In the following, a method for assembling the pneumatic device 1 according to FIGS. 4 and 5 is described. Such a method comprises the steps of providing an exhaust element 10 which is configured to provide a liquid impermeable but gas permeable barrier and arranging the exhaust element 10 in the pneumatic device 1 at a position associated with the exhaust path 15 and/or the exhaust port 17, such that a liquid impermeable bus gas permeable barrier between the housing 3 for receiving the electronic components and the environment 5 is provided, or a barrier between the housing 3 for receiving the electronic components and the damping chamber 11 respectively. It is preferred that the method further comprises the steps of providing a relay piston 26, pre-assembling the exhaust element 10 and the relay piston 26 and arranging the pre-assembled relay piston 26 with the exhaust element 10 in the exhaust path 15, wherein the exhaust element 10 and the relay piston 26 are preferably coupled by a snap-fit connection.

LIST OF REFERENCE SIGNS (PART OF THE SPECIFICATION)

1 pneumatic device
2 lower housing
3 housing for electronic components
5 environment
7 supply connection
9 working connection
10 exhaust element
11 damping chamber, silencer
12 exhaust portion
14 actuation element
15 exhaust path
17 exhaust port
18 breathing channel
19 flow path
20 sound damping material
21 bracket
22 equalizing chamber
23 throttle
23*a* flow cross-section of the throttle
25 housing cover
26 relay piston
27 sensor
29 solenoid valve
30 exhaust channel
100 brake system
102 front axle brake circuit
104 rear axle brake circuit
106.1, 106.2 front axle brake actuators
108.1, 108.2 rear axle brake actuators
110 front axle brake modulator
112 rear axle brake modulator
114 compressed air supply
116 front axle connecting line
118 rear axle connecting line
120.1, 120.2, 102.3 supply lines
122 exhaust line
11 remote exhaust silencer
200 vehicle
204 front axle
206 rear axle
208.1, 208.2 front wheels
210.1, 210.2 rear wheels
F flow direction

What is claimed is:

1. A pneumatic device (1) for a brake system (100), comprising:
 a housing (3) for receiving electronic components, the housing being in fluid communication with an exterior environment during operation of the pneumatic device (1); and
 an exhaust path (15) having an exhaust port (17), the exhaust path being in fluid communication with the housing (3), wherein the exhaust path exhausts the pneumatic device (1) to the exterior environment (5) via the exhaust port (17); and
 an exhaust element (10) associated with the exhaust path (15), wherein the exhaust element is a liquid impermeable but gas permeable membrane between the housing (3) and the exterior environment (5);
 a damping chamber (11) in fluid connection with the exhaust port (17) and the exterior environment (5);
 wherein the housing includes a lower housing and an upper housing;
 wherein the upper housing houses the electronic components;
 wherein the membrane is disposed inside of the lower housing;
 wherein a flow path (19) from the housing (3) to the exterior environment (5) extends at least partly through the damping chamber (11) to exhaust the pneumatic device (1).

2. The pneumatic device (1) according to claim 1, wherein the exhaust port is disposed inside of the lower housing;
 wherein the membrane is arranged in the exhaust path (15) upstream from the exhaust port (17).

3. The pneumatic device (1) according to claim 1, wherein the exhaust port is disposed inside of the lower housing;
 wherein the membrane is arranged in the exhaust port (17) adjacent to the damping chamber (11).

4. The pneumatic device (1) according to claim 1, further comprising a relay piston (26) arranged in the exhaust path (15), wherein the exhaust element (10) is coupled to the relay piston (26).

5. The pneumatic device (1) according to claim 4, wherein the exhaust element (10) is coupled to the relay piston (26) by a snap-fit connection.

6. The pneumatic device (1) according to claim 4, wherein the relay piston (26) is at least partly formed of a polymer.

7. The pneumatic device (1) according to claim 1, wherein the pneumatic device (1) is a pneumatic brake system (100), a relay valve, or a brake valve arrangement.

8. The pneumatic device according to claim 1, wherein the pneumatic device is part of the brake system (100).

9. The pneumatic device according to claim 8, wherein the brake system (100) is part of a commercial vehicle (200).

10. The pneumatic device according to claim 1, wherein the exhaust port is disposed inside of the lower housing upstream from an end of the exhaust path, wherein the membrane is disposed in the exhaust path between the exhaust port and the upper housing.

11. A pneumatic device (1) for a brake system (100), comprising:
- a housing (3) for receiving electronic components, the housing being in fluid communication with an exterior environment during operation of the pneumatic device (1); and
- an exhaust path (15) having an exhaust port (17), the exhaust path being in fluid communication with the housing (3), wherein the exhaust path exhausts the pneumatic device (1) to the exterior environment (5) via the exhaust port (17); and
- an exhaust element (10) associated with the exhaust path (15), wherein the exhaust element is a liquid impermeable but gas permeable membrane between the housing (3) and the exterior environment (5);
- an equalizing chamber (22) in fluid connection with the exhaust path (15), wherein the equalizing chamber provides an equalizing volume that reduces pressure peaks during operation of the pneumatic device (1);
- wherein the housing includes a lower housing and an upper housing;
- wherein the upper housing houses the electronic components;
- wherein the membrane is disposed inside of the lower housing.

12. The pneumatic device (1) according to claim 3, further comprising a damping chamber (11) in fluid connection with the exhaust port (17) and the exterior environment (5),
- wherein a flow path (19) from the housing (3) to the exterior environment (5) extends at least partly through the damping chamber (11) to exhaust the pneumatic device (1).

13. The pneumatic device (1) according to claim 11, further comprising a throttle (23) provided in the exhaust path (15), wherein the throttle narrows a flow cross section (23a) of the exhaust path (15).

14. The pneumatic device (1) according to claim 13, wherein the throttle (23) connects the equalizing chamber (22) to the exhaust port (17).

15. The pneumatic device (1) according to claim 13, wherein the equalizing volume of the equalizing chamber (22) is adapted to the peak pressure during operation of the pneumatic device (1).

16. The pneumatic device (1) according to claim 15, wherein the flow cross-section is adapted to the equalizing volume provided by the equalizing chamber (22) to avoid peak pressure during operation of the pneumatic device (1).

17. A method for assembling a pneumatic device (1), the method comprising the steps:
- providing a pneumatic device having a housing (3) for receiving electronic components, the housing being in fluid communication with an exterior environment during operation of the pneumatic device (1); and
- wherein the pneumatic device includes an exhaust path (15) having an exhaust port (17), the exhaust path being in fluid communication with the housing (3), wherein the exhaust path exhausts the pneumatic device (1) to the exterior environment (5) via the exhaust port (17); and
- providing an exhaust element (10), wherein the exhaust element is a liquid impermeable but gas permeable membrane,
- arranging the exhaust element (10) in the pneumatic device (1) at a position associated with the exhaust path (15) of the pneumatic device (1), wherein the exhaust element (10) provides the liquid impermeable but gas permeable membrane between the housing (3) of the pneumatic device (1) and the exterior environment (5);
- wherein the housing includes an upper housing and a lower housing, wherein the electronic components are disposed in the upper housing;
- wherein the membrane is disposed inside of the lower housing
- wherein the exhaust port is disposed inside of the lower housing;
- wherein the pneumatic device (1) includes a damping chamber (11) in fluid connection with the exhaust port (17) and the exterior environment (5), wherein a flow path (19) from the housing (3) to the exterior environment (5) extends at least partly through the damping chamber (11) to exhaust the pneumatic device (1), and wherein the membrane is arranged in the exhaust port (17) adjacent to the damping element (11) or in the exhaust path (15) upstream from the exhaust port (17).

18. The method according to claim 17, further comprising the steps of:
- providing a relay piston (26),
- pre-assembling the exhaust element (10) and the relay piston (26),
- arranging the pre-assembled relay piston (26) and exhaust element (10) in the exhaust path (15).

19. The method according to claim 17, wherein the pneumatic device (1) includes:
- an equalizing chamber (22) in fluid connection with the exhaust path (15), wherein the equalizing chamber provides an equalizing volume that reduces pressure peaks during operation of the pneumatic device (1);
- a throttle (23) provided in the exhaust path (15), wherein the throttle narrows a flow cross section (23a) of the exhaust path (15);
- wherein the throttle (23) connects the equalizing chamber (22) to the exhaust port (17);
- wherein the equalizing volume of the equalizing chamber (22) is adapted to the peak pressure during operation of the pneumatic device (1);
- wherein the flow cross-section is adapted to the equalizing volume provided by the equalizing chamber (22) to avoid peak pressure during operation of the pneumatic device (1).

* * * * *